United States Patent
Kim et al.

(10) Patent No.: US 11,884,303 B2
(45) Date of Patent: Jan. 30, 2024

(54) APPARATUS AND METHOD FOR DETERMINING LANE CHANGE OF SURROUNDING OBJECTS

(71) Applicant: Vueron Technology Co., Ltd, Seoul (KR)

(72) Inventors: Jaekwang Kim, Bucheon-si (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 140 days.

(21) Appl. No.: 17/402,874

(22) Filed: Aug. 16, 2021

(65) Prior Publication Data
US 2022/0410942 A1 Dec. 29, 2022

(30) Foreign Application Priority Data
Jun. 24, 2021 (KR) .......................... 10-2021-0082520

(51) Int. Cl.
*B60W 30/18* (2012.01)
*B60W 30/095* (2012.01)
(Continued)

(52) U.S. Cl.
CPC .... *B60W 60/00274* (2020.02); *B60W 30/095* (2013.01); *B60W 30/18163* (2013.01);
(Continued)

(58) Field of Classification Search
CPC ......... B60W 60/00274; B60W 30/095; B60W 30/18163; B60W 2420/52;
(Continued)

(56) References Cited

U.S. PATENT DOCUMENTS

| 11,584,386 B2 * | 2/2023 | Chiba | .................... B62D 1/286 |
| 2010/0049405 A1 * | 2/2010 | Li | .......................... G08G 1/167 |
| | | | 701/45 |

(Continued)

FOREIGN PATENT DOCUMENTS

| KR | 20190056775 A | * 11/2017 |
| KR | 10-2019-0056775 A | 5/2019 |

(Continued)

OTHER PUBLICATIONS

Oh Tae Dong, Nov. 17, 2017, English Machine Translation_KR2019/0056775A provided by Patent Translate by EPO and Google (Year: 2017).*

(Continued)

*Primary Examiner* — Peter D Nolan
*Assistant Examiner* — Ashley L Redhead, Jr.
(74) *Attorney, Agent, or Firm* — Bridgeway IP Law Group, PLLC; Jihun Kim

(57) ABSTRACT

A method for determining a lane change, performed by an apparatus for determining a lane change of an object located around a driving vehicle with which is equipped a sensor, the method including, detecting a plurality of objects located around the driving vehicle using scanning information obtained repeatedly at every predetermined period of time by the sensor scanning surroundings of the driving vehicle, selecting at least one candidate object estimated to change lanes among the plurality of objects based on previously detected lane edge information and determining whether the candidate object changes lanes based on information on movement of the candidate object.

17 Claims, 20 Drawing Sheets

(51) Int. Cl.
*G06V 10/75* (2022.01)
*G06F 18/22* (2023.01)
*B60W 60/00* (2020.01)
*G06V 20/56* (2022.01)

(52) U.S. Cl.
CPC ............ *G06F 18/22* (2023.01); *G06V 10/755* (2022.01); *G06V 20/588* (2022.01); *B60W 2420/52* (2013.01); *B60W 2554/4042* (2020.02); *B60W 2554/4043* (2020.02); *B60W 2554/4044* (2020.02); *B60W 2554/4049* (2020.02); *B60W 2554/805* (2020.02)

(58) Field of Classification Search
CPC . B60W 2554/4042; B60W 2554/4043; B60W 2554/4044; B60W 2554/4049; B60W 2554/805; G06F 18/22; G06V 10/755; G06V 20/588; G06V 10/44; G06V 10/762
See application file for complete search history.

(56) References Cited

U.S. PATENT DOCUMENTS

| | | | | |
|---|---|---|---|---|
| 2010/0256835 | A1* | 10/2010 | Mudalige | G08G 1/164 701/2 |
| 2013/0325306 | A1* | 12/2013 | Caveney | B60W 30/0953 701/117 |
| 2017/0316684 | A1* | 11/2017 | Jammoussi | G08G 1/0112 |
| 2018/0286242 | A1* | 10/2018 | Talamonti | B62D 15/025 |
| 2019/0256083 | A1* | 8/2019 | Kang | B60W 30/09 |
| 2019/0351906 | A1* | 11/2019 | Oh | B60W 30/095 |
| 2019/0359228 | A1* | 11/2019 | Banno | G09G 5/38 |
| 2020/0148261 | A1* | 5/2020 | Varunjikar | B62D 15/0265 |
| 2020/0207353 | A1* | 7/2020 | Chen | B60W 30/18163 |
| 2020/0317192 | A1* | 10/2020 | Awane | B62D 15/025 |
| 2020/0391746 | A1* | 12/2020 | Parks | B60W 60/00276 |
| 2020/0406891 | A1* | 12/2020 | Kamiya | G05D 1/0212 |
| 2021/0009115 | A1* | 1/2021 | Ohmura | B60T 7/12 |
| 2021/0086768 | A1* | 3/2021 | Komoguchi | G08G 1/16 |
| 2021/0117701 | A1* | 4/2021 | Janardhana | G06F 18/24 |
| 2021/0122374 | A1* | 4/2021 | Da Silva | G01C 21/3658 |
| 2021/0155289 | A1* | 5/2021 | Nilsson | B62D 15/025 |
| 2021/0179106 | A1* | 6/2021 | Kim | B60W 40/04 |
| 2021/0188356 | A1* | 6/2021 | Goto | B62D 6/00 |
| 2021/0197824 | A1* | 7/2021 | Kim | B60K 35/00 |
| 2021/0224556 | A1* | 7/2021 | Xu | G06V 10/44 |
| 2021/0380099 | A1* | 12/2021 | Lee | G08G 1/0141 |
| 2022/0063629 | A1* | 3/2022 | Oh | G08G 1/166 |
| 2022/0105954 | A1* | 4/2022 | Li | H04W 76/14 |
| 2022/0164602 | A1* | 5/2022 | Frtunikj | G06V 20/56 |
| 2022/0266840 | A1* | 8/2022 | Kim | G06V 20/58 |
| 2022/0340137 | A1* | 10/2022 | Ollis | G05D 1/0088 |
| 2022/0410942 | A1* | 12/2022 | Kim | B60W 30/18163 |

FOREIGN PATENT DOCUMENTS

| | | |
|---|---|---|
| KR | 10-2020-0084440 A | 7/2020 |
| KR | 20200084440 A * | 7/2020 |

OTHER PUBLICATIONS

Lee Sang Sun, Jul. 13, 2020, English Machine Translation_KR2020/0084440 provided by Patent Translate by EPO and Google (Year: 2020).*

* cited by examiner

APPARATUS AND METHOD FOR DETERMINING LANE CHANGE OF SURROUNDING OBJECTS

CROSS-REFERENCE TO RELATED APPLICATION

This application claims priority to Korean Patent Application No. 10-2021-0082520, filed on Jun. 24, 2021. The entire content of the application on which the priority is based is incorporated herein by reference.

TECHNICAL FIELD

The present disclosure relates to an apparatus and method for determining a lane change of an object located around a driving vehicle.

BACKGROUND

For autonomous driving, it is necessary to determine objects dangerous to a driving vehicle that is traveling among objects located around the driving vehicle and to control the driving vehicle. To determine dangerous objects, it is necessary to detect a speed of the driving vehicle that is traveling and positions, shapes, speeds, and moving directions of objects around the driving vehicle, to perceive an object that may be dangerous to the driving vehicle, and to control avoidance driving by accelerating or decelerating the driving vehicle or changing a travel direction of the driving vehicle using information on determined objects.

Although a position and a speed of an object can be detected using a camera or a radar sensor, the radar sensor has defects that results of detection of a position and a speed of an object in a lateral direction perpendicular to a travel direction of the driving vehicle that is traveling is low and it is difficult to provide information on the shape of an object, and thus the accuracy of determination a lane-changing object in advance are inaccurate. Further, in the case of a camera sensor, reliability in a position, a three-dimensional shape, and speed information of an object is questioned since three-dimensional information are estimated from two-dimensional detection results.

Accordingly, there is a need for a technology for accurately obtaining positions and shapes of objects and correctly estimating speeds and moving directions for autonomous driving.

Particularly, in a situation of an urgent lane change of a neighboring driving vehicle which occurs in a congested state, e.g., a situation in which a neighboring driving vehicle moves from a adjacent lane to a lane within which a driving vehicle is traveling, information on more rapid and accurate determination than in a normal traveling situation is required.

SUMMARY

An object of the present invention is to determine a lane change of an object located around a driving vehicle with which a LIDAR sensor or camera sensor is equipped.

Technical objects to be achieved by the present disclosure are not limited to the aforementioned technical objects, and other technical objects not described above may be evidently understood by a person having ordinary skill in the art to which the present disclosure pertains from the following description.

In accordance with an aspect of the present disclosure, there is provided a method for determining a lane change, performed by an apparatus for determining a lane change of an object located around a driving vehicle with which is equipped a sensor, the method including, detecting a plurality of objects located around the driving vehicle using scanning information obtained repeatedly at every predetermined period of time by the sensor scanning surroundings of the driving vehicle, selecting at least one candidate object estimated to change lanes among the plurality of objects based on previously detected lane edge information and determining whether the candidate object changes lanes based on information on movement of the candidate object.

In accordance with another aspect of the present disclosure, there is provided an apparatus for determining a lane change of an object located around a driving vehicle, the apparatus including, a memory configured to store scanning information obtained by scanning surroundings of the driving vehicle and a processor configured to determine a lane change of the object from the scanning information, wherein the processor is configured to detect a plurality of objects located around the driving vehicle using scanning information obtained repeatedly at every predetermined period of time by the sensor scanning surroundings of the driving vehicle, to select at least one candidate object estimated to change lanes among the plurality of objects based on previously detected lane edge information, and to determine whether the candidate object changes lanes based on information on movement of the candidate object.

According to embodiments of the present invention as described above, it is possible to determine a lane change of an object located around a driving vehicle using a LIDAR sensor.

Accordingly, it is possible to determine an object that may be dangerous to a driving vehicle not only in a normal traveling state but also in a congested state, and thus the present invention can be applied to determination of an object dangerous to a driving vehicle and generation of a traveling route such as an avoidance route.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
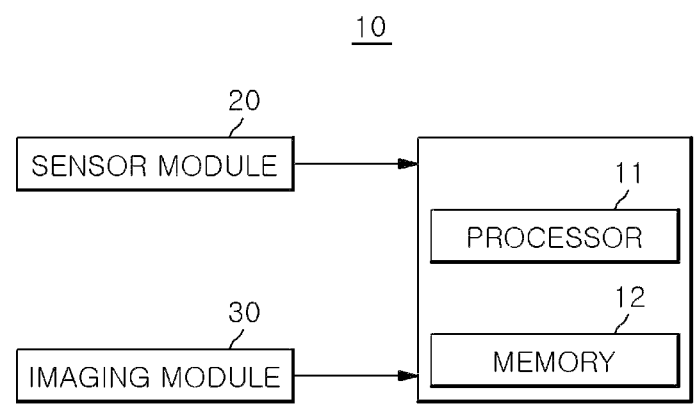
FIG. 1 is a block diagram showing an apparatus for determining a lane change of a neighboring object according to an embodiment of the present invention.

FIG. 1 is a block diagram showing an apparatus for determining a lane change of a neighboring object according to an embodiment of the present invention.

Referring to FIG. 1, the apparatus 10 for determining a lane change of a neighboring object according to an embodiment of the present invention includes a processor 11 and a memory 12.

The apparatus 10 for determining a lane change of a neighboring object according to an embodiment of the present invention may be included in a driving vehicle with which is equipped a sensor to detect objects around the driving vehicle and is an apparatus for determining a lane change of neighboring objects based on a LIDAR sensor for autonomous driving.

Here, a driving vehicle means an autonomous driving vehicle or a driving vehicle at least a part of which can autonomously travel, and the driving vehicle type is not limited.

A neighboring object means a driving vehicle traveling in a lane adjacent to a lane in which the driving vehicle is traveling.

Specifically, a lane change of a neighboring object means a change from a second lane closest to a first lane within which the driving vehicle is traveling to the first lane and may be referred to as cut-in.

Further, a detected lane edge refers to at last one of two edges included in a lane, and a lane change of a driving vehicle entering from the left or right edge of a lane can be detected.

To determine a lane-changing object, the apparatus 10 for determining a lane change of a neighboring object according to an embodiment of the present invention detects an object through ground detection, clustering, and shape estimation processes using scanning points input from a LIDAR sensor and extracts box information and contour information of the object. Here, a box information means a box-shaped layout including the shape of an object. Candidate objects that may be determined to be lane-changing objects are searched using detected object information and lane edge information detected through a camera sensor. The same object in consecutive frames is determined and maintained by performing a data association process on the searched candidate objects, and speeds of objects in the longitudinal/lateral directions and angular speeds of the objects in heading directions are estimated through Kalman filtering. An object that will enter the lane within a specific time is estimated using the estimated speeds and angular speeds of the objects and determined to be a lane-changing object.

The memory 12 included in the apparatus 10 for determining a lane change of a neighboring object according to an embodiment of the present invention may store programs (one or more instructions) for processing and control of the processor 11 and scanning information obtained by scanning surroundings of the driving vehicle and received from a sensor module 20 and may include a computer readable storage medium of at least one of flash memory type, hard disk type, multimedia card micro type, an card type memories (e.g., SD, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Here, the sensor module 20 is provided outside the apparatus 10 for determining a lane change of a neighboring object and may be included in the driving vehicle. Specifically, the sensor module 20 is a module including a LIDAR sensor, and the scanning information obtained by scanning the surroundings of the driving vehicle and stored in the memory 12 may be information about a plurality of scanning points obtained through the LIDAR sensor.

The programs stored in the memory 12 may be divided into a plurality of modules according to functions.

In addition, images obtained by capturing surroundings of the driving vehicle and received from an imaging device 30 may be stored. The processor 11 of the apparatus 10 for determining a lane change of a neighboring object according to an embodiment of the present invention perceives lane edges using received captured images of surroundings of the driving vehicle.

The imaging device 30 may be, for example, a device capable of capturing still images and moving images and may include a camera sensor, one or more image sensors (e.g., front sensor or rear sensors), a lens, an image signal processor (ISP), or a flash (e.g., LED or xenon lamp) according to an embodiment.

The processor 11 executes one or more instructions stored in the memory 12. Specifically, the processor 11 detects a plurality of objects located around the driving vehicle using scanning information obtained repeatedly at every predetermined period of time by the sensor scanning surroundings of the driving vehicle, selects at least one object estimated to change lanes among the plurality of objects based on previously detected lane edge information, and determines whether the candidate object changes lanes based on information on movement of the candidate object.

Here, the processor 11 may be divided into a plurality of modules according to functions, and a single processor may execute functions. The processor may include one or more of a central processing unit (CPU), an application processor (AP), a micro controller unit (MCU) and a communication processor (CP).

Figure 2:
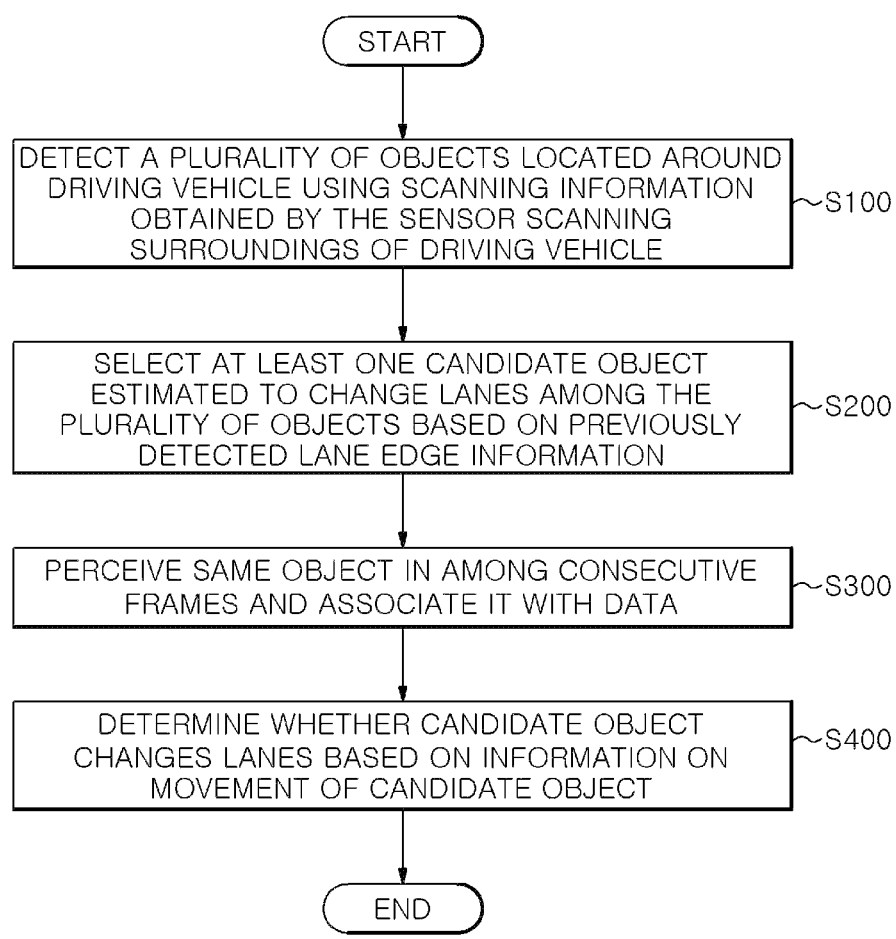
FIG. 2 is a flowchart showing a method for determining a lane change of a neighboring object according to an embodiment of the present invention.

FIG. 2 is a flowchart showing a method for determining a lane change of a neighboring object according to an embodiment of the present invention.

The method for determining a lane change of a neighboring object according to an embodiment of the present invention is a method for determining a lane-changing object which neighbors a driving vehicle that is traveling and may be dangerous to the driving vehicle using objects detected through a LIDAR sensor. In the method for determining a lane change of a neighboring object according to an embodiment of the present invention, object information is extracted using scanning points input from the LIDAR sensor and candidate objects are selected using the extracted object information and lane edge information detected by a camera sensor. Then, speeds of the candidate objects and angular speeds of the candidate objects in heading directions are estimated to determine an object estimated to change lanes.

Specifically, referring to FIG. 2, the method for determining a lane change of a neighboring object according to an embodiment of the present invention is performed by the apparatus for determining a lane change of an object located around a driving vehicle and detects a plurality of objects located around the driving vehicle using scanning information obtained repeatedly at every predetermined period of time by the sensor scanning surroundings of the driving vehicle in step S100.

Here, a lane change means a change from a second lane closest to a first lane within which the driving vehicle is traveling to the first lane. A detected lane edge refers to at least one of two edges included in a lane, and a lane change of a driving vehicle entering from the left or right edge of a lane can be detected.

Further, the scanning information includes a plurality of scanning points obtained through the LIDAR sensor.

In step S200, at least one candidate object estimated to change lanes is selected among the plurality of objects based on previously detected lane edge information.

Here, the sensor further includes an imaging device and the previously detected lane edge information includes coordinate information of lane edges detected from images obtained through the imaging device.

Further, the previously detected lane edge information includes information detected by extracting lane edge points corresponding to lane edges based on intensity information of the ground surface scanning points included in the ground on which the driving vehicle is located among the plurality of obtained scanning points.

In step S300, the same object in among consecutive frames, each frame including scanning information obtained at a time is perceived and associated the scanning information of the same object with one another after the selecting at least one candidate object estimated to change lanes among the plurality of objects.

In step S400, it is determined whether the candidate object changes lanes based on information on movement of the candidate object.

Here, the information on movement of the candidate object may be information including at least one of a speed in the longitudinal direction, a speed in the lateral direction, and an angular speed in a heading direction.

Figure 3:
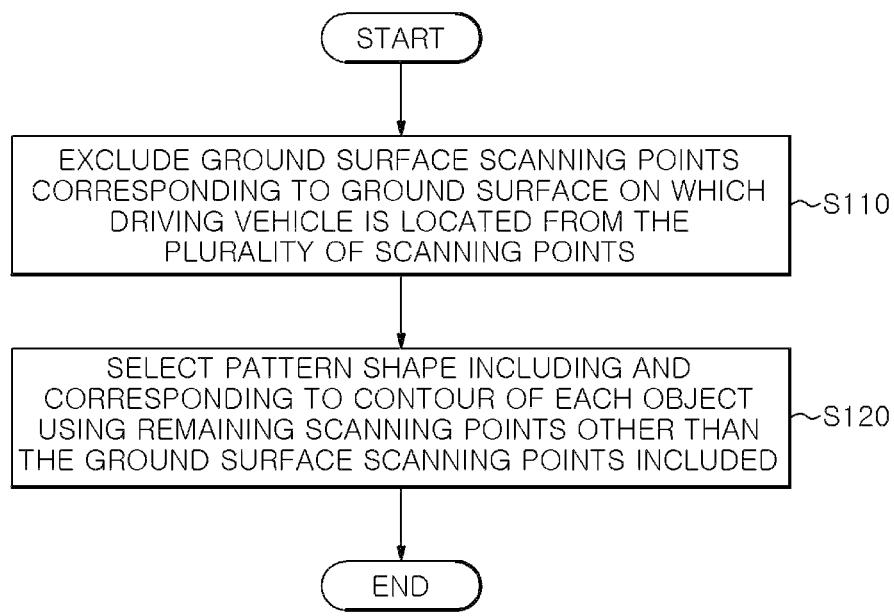
FIG. 3 is a flowchart showing a method for detecting an object shape according to an embodiment of the present invention.

FIG. 3 is a flowchart showing a method for detecting an object shape according to an embodiment of the present invention.

Referring to FIG. 3, in the step S100 of detecting the plurality of objects located around the driving vehicle according to an embodiment of the present invention, ground surface scanning points corresponding to the ground surface on which the driving vehicle is located are excluded from the plurality of scanning points in step S110.

Here, the ground may refer to the ground of a road. The apparatus for determining a lane change of a neighboring object detects the ground of a road using input scanning points. To detect the ground, a plane fitting method is used. Four points are selected from input points to generate a plane ($ax+by+cz+d=0$) and inlier points (points having perpendicular distances of equal to or less than a specific value from the plane) are detected. This operation is repeated N times to generate planes, a plane having a largest number of inlier points corresponding thereto is selected and used as a plane of a road. Points within a specific height from the detected plane of the road are classified as ground points.

In step S120, a pattern shape including and corresponding to the contour of each object is selected using remaining scanning points other than the ground surface scanning points.

Specifically, points other than the detected ground points are used as object points. A clustering process of connecting points as clusters using three-dimensional distance differences between object points is performed. The object points are generated as objects in clusters through a method of connecting points having distances from other points within a specific distance to generate a single object based on x, y, and z positions of each point in the three-dimensional space.

To use point information in objects in order to associate clustered objects with consecutive frames, estimate speeds, and determine a lane-changing object, a considerable amount of computation is required. Accordingly, shape information can be extracted to reduce the amount of computation in units of a point in an embodiment of the present invention. Shape information of an object includes box information and contour information for representing the object.

FIG. 4 to FIG. 8 are diagrams for describing the step of detecting a plurality of objects located around a driving vehicle according to an embodiment of the present invention.

Figure 4:
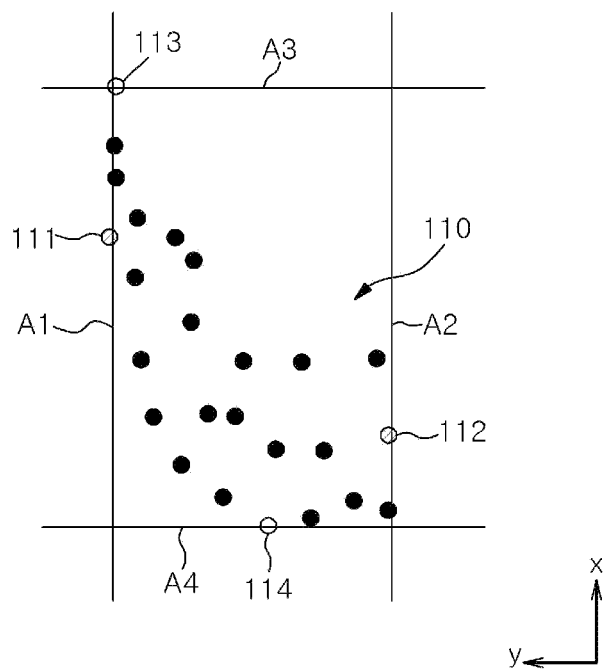
FIG. 4 is a diagram for describing a step of detecting a plurality of objects located around a driving vehicle in the method for determining a lane change of a neighboring object according to an embodiment of the present invention.
Figure 5:
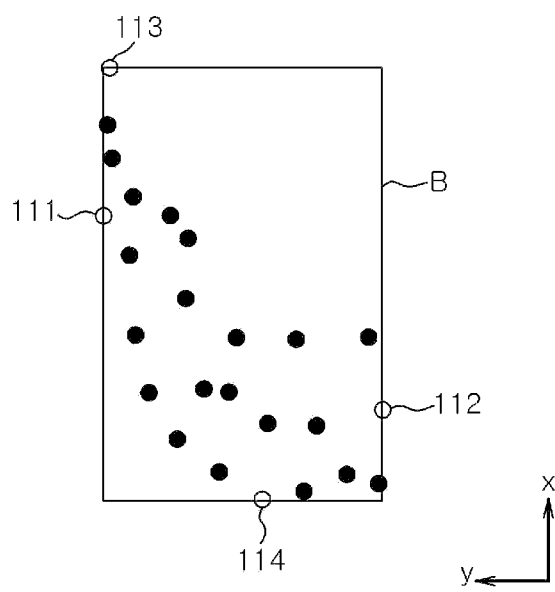
FIG. 5 is a diagram for describing a step of detecting a plurality of objects located around a driving vehicle in the method for determining a lane change of a neighboring object according to an embodiment of the present invention.

As shown in FIG. 4 and FIG. 5, to minimize the amount of computation, box information B in a rectangular shape is extracted using straight lines A3 and A4 that pass closest and farthest points 113 and 114 in the longitudinal direction from among scanning points 110 in an object and are perpendicular to the longitudinal direction and straight lines A1 and A2 that pass closest and farthest points 111 and 112 in the lateral direction from among the scanning points 110 and are perpendicular to the lateral direction. The extracted box information B may be used to search for candidate objects and associate them with data. Although the box information B is represented as a rectangle in an embodiment of the present invention, the box information B is not limited thereto and may be implemented in various layout forms.

Here, the longitudinal direction means an x-axis direction based on the position of the driving vehicle and the lateral direction means a y-axis direction based on the position of the driving vehicle.

Figure 20:
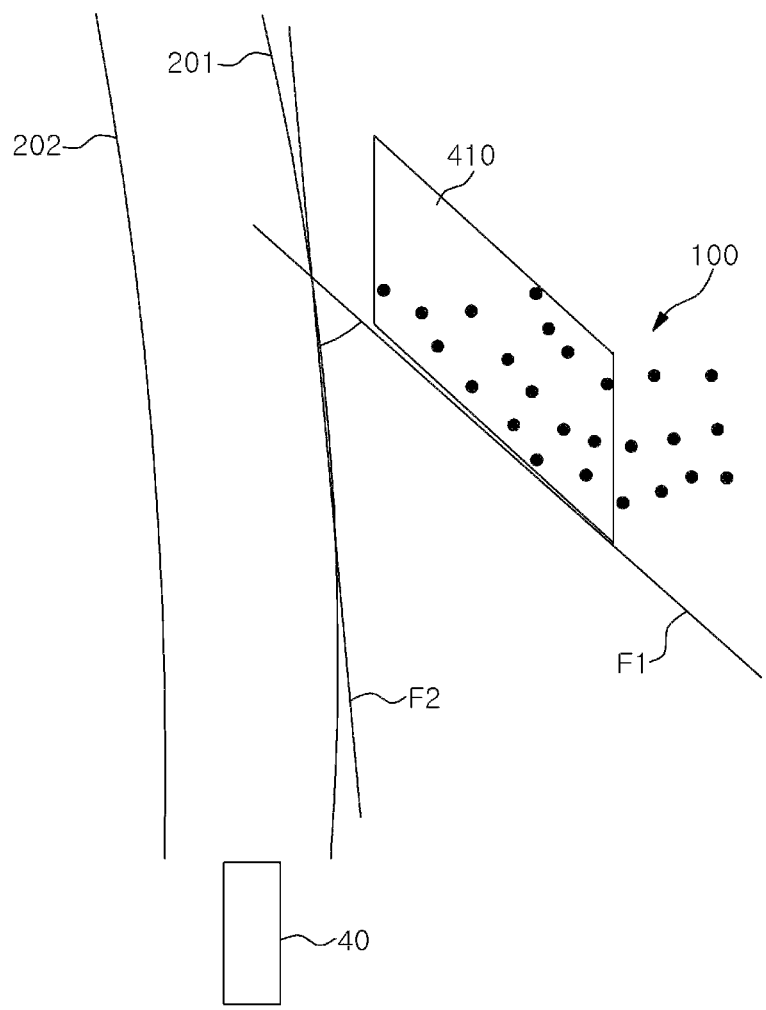
FIG. 20 is a diagram for describing the step of detecting a side of a candidate object according to an embodiment of the present invention.

The scanning information includes a plurality of scanning points obtained through the LIDAR sensor and may be obtained as a plurality of scanning point 100 in a three-dimensional vision, as shown in FIG. 20.

In the step S100 of detecting the plurality of objects located around the driving vehicle according to an embodiment of the present invention, a contour is detected by projecting three-dimensional scanning points to a two-dimensional space.

Figure 8:
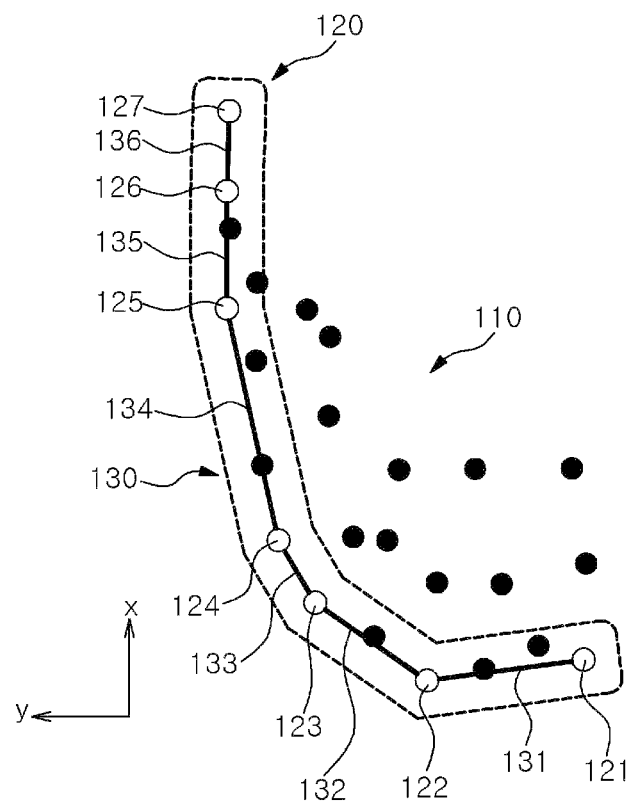
FIG. 8 is a diagram for describing a step of detecting a plurality of objects located around a driving vehicle in the method for determining a lane change of a neighboring object according to an embodiment of the present invention.

An order of the scanning points 110 projected to the two-dimensional space is determined according to angles based on the sensor module position, and it is determined whether each point is a contour point using a contour point detection method. Determined contour points are connected to detect a contour as shown in FIG. 8.

Figure 6:
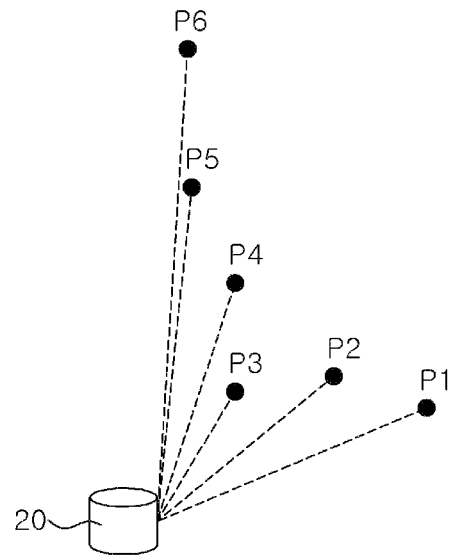
FIG. 6 is a diagram for describing a step of detecting a plurality of objects located around a driving vehicle in the method for determining a lane change of a neighboring object according to an embodiment of the present invention.
Figure 7:
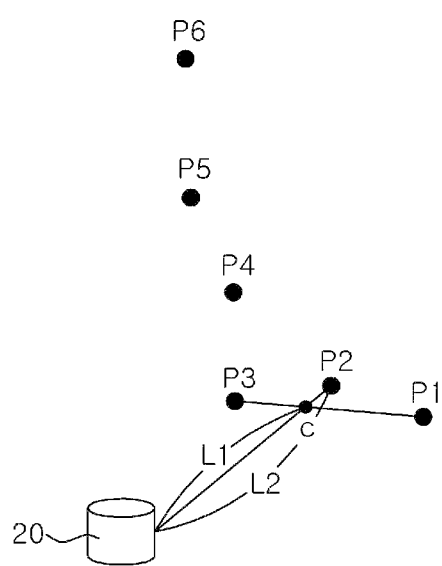
FIG. 7 is a diagram for describing a step of detecting a plurality of objects located around a driving vehicle in the method for determining a lane change of a neighboring object according to an embodiment of the present invention.

FIG. 6 and FIG. 7 are diagrams for describing a step of determining contour points in the step of detecting the plurality of objects located around the driving vehicle according to an embodiment of the present invention.

A contour point means an outermost point among points in an object. FIG. 6 illustrates sequential allocation of index values P1, P2, P3, P4, P5, and P6 to a plurality of projected scanning points according to scanning angles. The scanning points are aligned according to angles based on the position of the sensor module 20 to determine an order of the points, the points are searched in the determined order, and it is determined whether the corresponding point is a contour point.

FIG. 7 shows a contour point determination method. Point #N (here, N is a natural number of 1 or more) and point #N+2 are connected to generate a first connection line based on the allocation order of the index values P1, P2, P3, P4, P5, and P6. The position of the sensor module 20 is set as a reference point and the reference point and point #N+1 are connected to generate a second connection line. A distance between the reference point and an intersection of the first connection line and the second connection line is compared to the length of the second connection line, and point #N+1 is determined to be a contour point if the length of the second connection line is less than the distance between the reference point and the intersection.

For example, the point P1 and the point P3 may be connected to generate the first connection line L1 and the reference point 20 and the point P2 may be connected to generate the second connection line L2.

Here, since the length L2 of the second connection line is greater than the distance L1 between the reference point 20 and the intersection c of the first connection line and the second connection line, it can be ascertained that the point P2 is not a contour point and is positioned inside the object.

If the point P2 and the point P4 are connected to generate a third connection line and the reference point and the point P3 are connected to generate a fourth connection line, the point P3 may be determined to be a contour point because the length of the fourth connection line is less than the distance between the reference point and the intersection of the third connection line and the fourth connection line.

FIG. 8 shows an example of a result of detection of a contour in the step of detecting the plurality of objects located around the driving vehicle according to an embodiment of the present invention.

Two contour points closest to each other among the determined contour points 120 are connected to generate an outer line, and outer lines generated in this manner are connected to obtain line information.

As shown in FIG. 8, contour points 121, 122, 123, 124, 125, 126, and 127 may be determined from point data 110 projected to the two-dimensional space, two contour points closest to each other are connected to generate an outer line, and outer lines 131, 132, 133, 134, 135, and 136 generated in this manner are connected to obtain a line 130 as line information.

Figure 9:
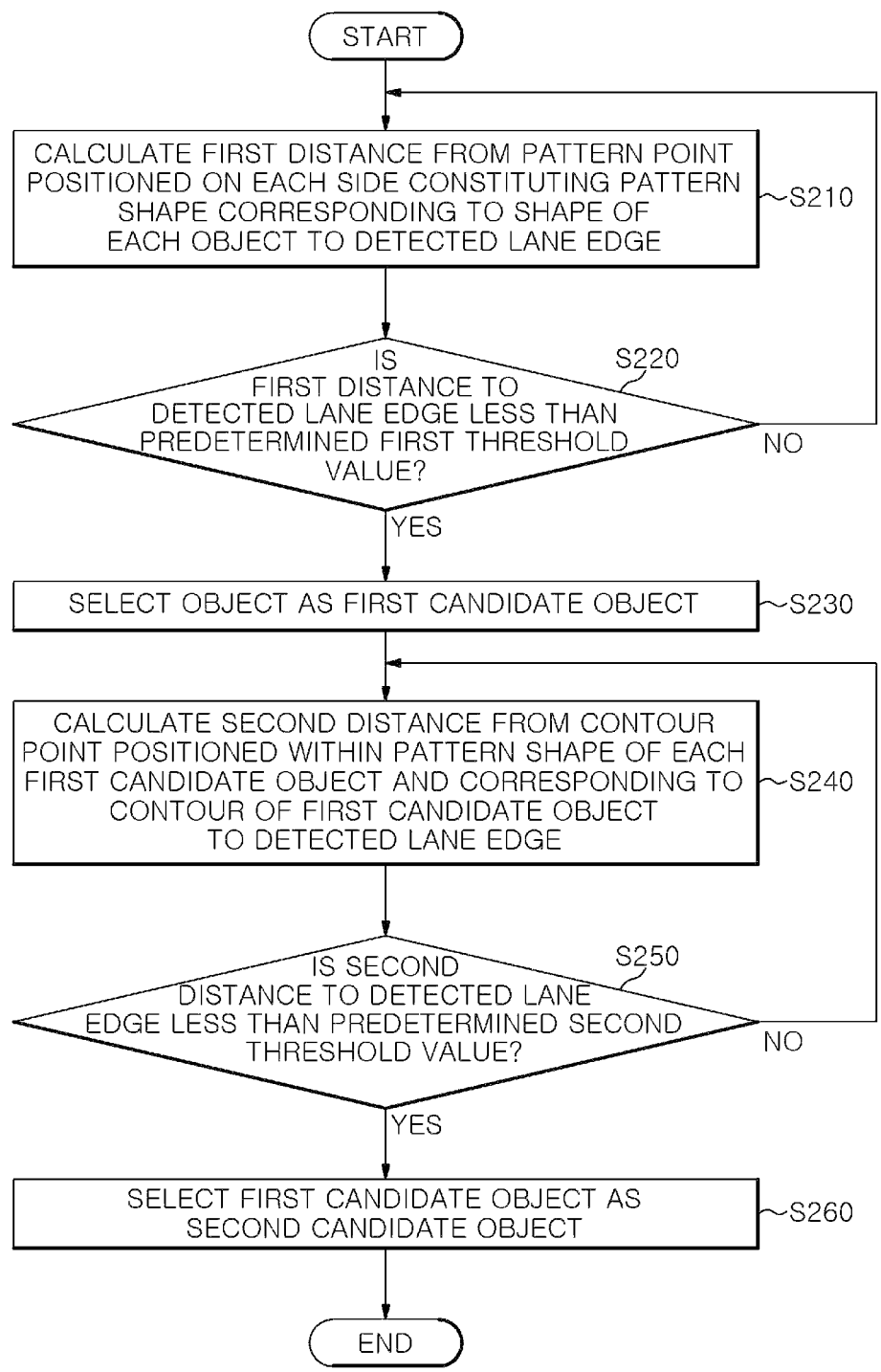
FIG. 9 is a flowchart showing a step of selecting at least one candidate object estimated to change lanes according to an embodiment of the present invention.

FIG. 9 is a flowchart showing the step of selecting at least one candidate object estimated to change lanes according to an embodiment of the present invention.

Referring to FIG. 9, in the step S200 of selecting at least one candidate object estimated to change lanes among the plurality of objects, a first distance from a pattern point positioned on one side constituting a pattern shape corresponding to the shape of the selected object and a detected lane edge of a lane within which the driving vehicle travels is calculated in step S210.

The first distance to the detected lane edge is compared to a predetermined first threshold value in step S220, and the object is classified as a first candidate object if the first distance to the detected lane edge is less than the predetermined first threshold value in step S230.

A second distance from a contour point positioned within the pattern shape of the first candidate object and corresponding to the contour of the first candidate object to the detected lane edge is calculated in step S240.

The second distance to the detected lane edge is compared to a predetermined second threshold value in step S250, and the first candidate object is selected as a second candidate object if the second distance to the detected lane edge is less than the predetermined second threshold value in step S260.

Figure 10:
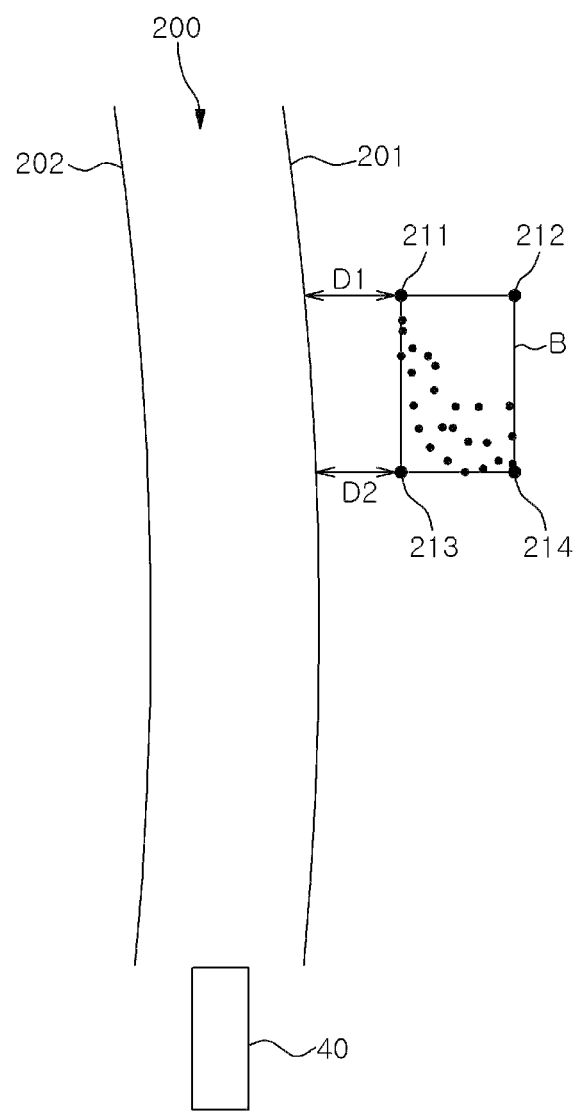
FIG. 10 is a diagram for describing the step of selecting at least one candidate object estimated to change lanes according to an embodiment of the present invention.
Figure 11:
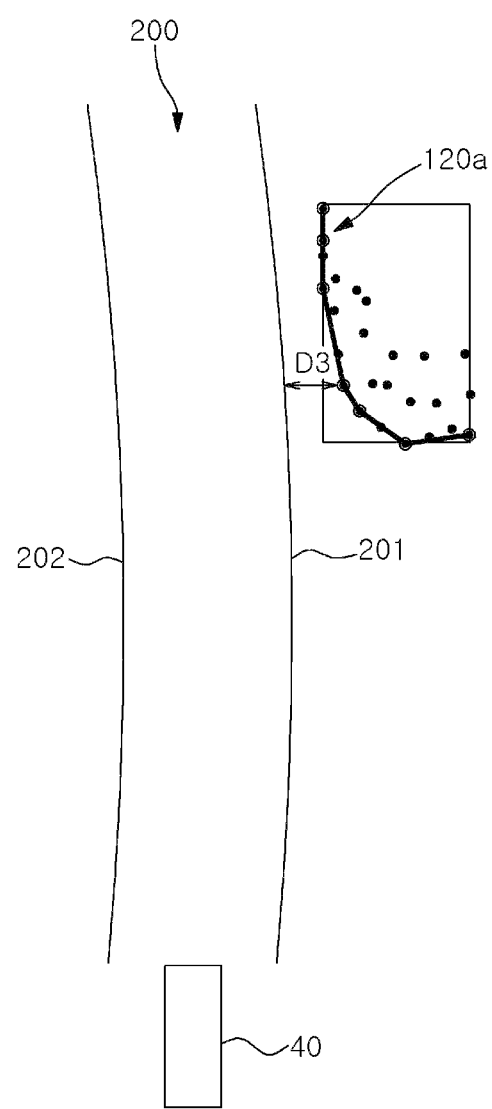
FIG. 11 is a diagram for describing the step of selecting at least one candidate object estimated to change lanes according to an embodiment of the present invention.
Figure 12:
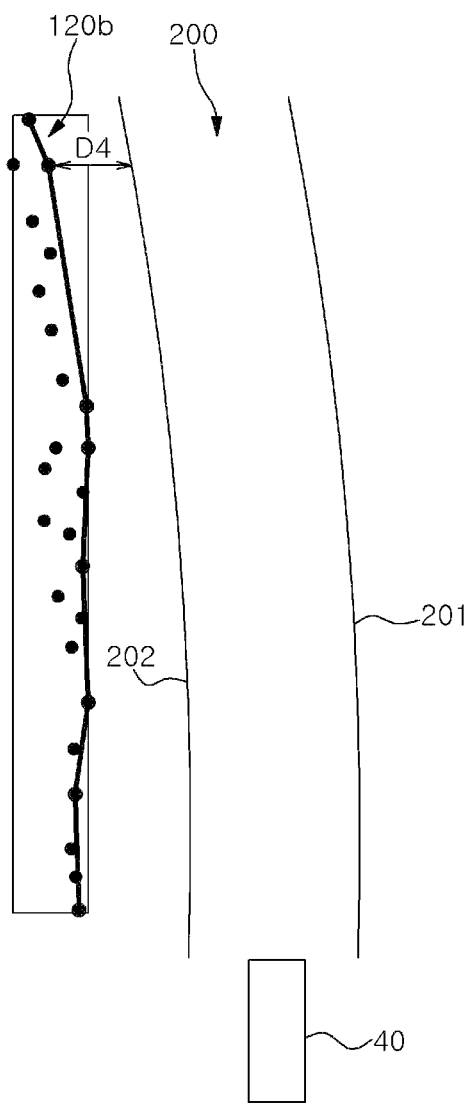
FIG. 12 is a diagram for describing the step of selecting at least one candidate object estimated to change lanes according to an embodiment of the present invention.

FIG. 10 to FIG. 12 are diagrams for describing the step of selecting at least one candidate object estimated to change lanes according to an embodiment of the present invention.

Prior to determining a lane-changing object, candidate objects are searched. Since a considerable amount of computation is necessary to execute lane-changing object determination logic for all objects, the present invention selects candidate objects in order to minimize the amount of computation. To select candidate objects, shape information of previously detected objects and lane edge information detected through the camera sensor are used.

As shown in FIG. 10, distances D1 and D2 in the lateral direction from four corner points 211, 212, 213, and 214 of a detected object box information B at positions in the longitudinal direction to a lane edge are calculated. Objects having distances corresponding to a predetermined distance or less are selected as first candidate objects.

For example, distances D1 and D2 in the lateral direction from an object that is traveling in a second lane closest to a first lane 200 within which a driving vehicle 40 is traveling to a first lane edge 201 between the first lane edge 201 and a second lane edge 202 of the first lane 200 are calculated, and if the first distances D1 and D2 to the detected lane edge are less than the predetermined first threshold value, the object may be selected as a first candidate object. Here, the predetermined first threshold value may be a value set using a plurality of pieces of survey data with respect to points at which a lane change has been estimated in advance.

Then, as shown in FIG. 11 and FIG. 12, to accurately determine candidate objects selected using the box information, distances in the lateral direction between a lane edge and contour points are calculated, it is determined whether objects are within a predetermined distance or less, and objects within the predetermined distance or less are selected as candidate objects. Through this process, the number of objects for lane-changing object determination can be decreased and thus the amount of computation can be reduced.

For example, as shown in FIG. 11, second distances D3 in the lateral direction from contour points 120a of an object that is traveling in the second lane closest to the first lane 200 in which the driving vehicle 40 is traveling to the first lane edge 201 between the first lane edge 201 and the second lane edge 202 of the first lane are calculated, and if the second distances D3 to the detected lane edge are less than the predetermined threshold value, the first candidate object may be selected as a second candidate object. Here, the predetermined second threshold value may be a value set using a plurality of pieces of survey data with respect to points at which a lane change has been estimated in advance.

As shown in FIG. 12, distances D4 in the lateral direction from contour points 120b of an object that is traveling in a third lane closest to the first lane 200 in which the driving vehicle 40 is traveling to the second lane edge 202 between the first lane edge 201 and the second lane edge 202 of the first lane are calculated, and if the second distances D4 to the detected lane edge are greater than the predetermined threshold value, the object is excluded from candidate objects. Here, the predetermined second threshold value may be a value set using a plurality of pieces of survey data with respect to points at which a lane change has been estimated in advance.

Figure 13:
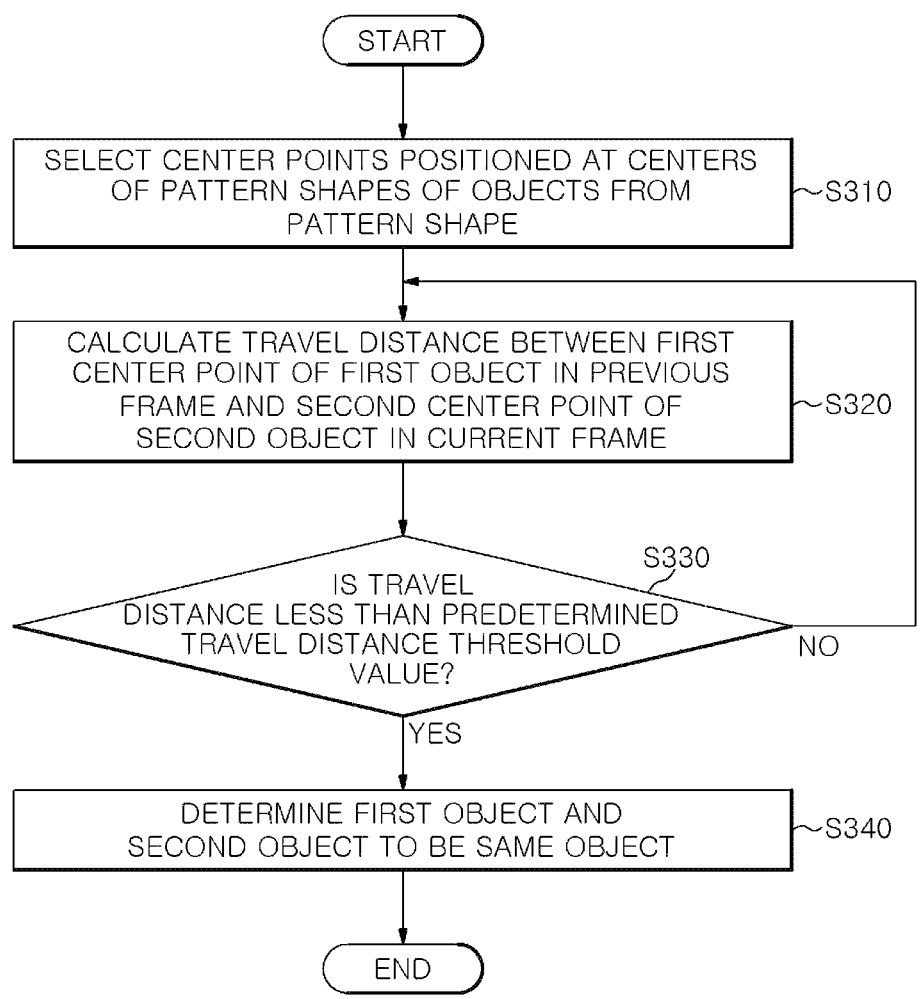
FIG. 13 is a flowchart showing a step of perceiving the same object in consecutive frames according to an embodiment of the present invention.

FIG. 13 is a flowchart showing the step of perceiving the same object in consecutive frames and associating the object with data according to an embodiment of the present invention.

To determine and maintain the same object in consecutive frames, a data association process is performed. Accordingly, detected candidate objects may be associated. To associate candidate objects detected in a previous frame and a current frame with each other, box information is used. To calculate a center point of a box-shaped layout, average coordinates of position coordinates of four points at corners of the box-shaped layout are calculated, an average point positioned at the average coordinates is extracted, a distance between candidate objects in previous and current frames is calculated, and objects having a distance of a predetermined distance or less and closest to each other are selected and associated as the same object. Here, the same object means objects perceived to be identical from among a plurality objects perceived in consecutive frames, and information on movement of the same object can be confirmed.

Specifically, referring to FIG. 13, in the step S300 of perceiving the same object in consecutive frames and associating the scanning information of the same object with one another according to an embodiment of the present invention, center points positioned at the centers of pattern shapes of objects of the respective consecutive frames are selected from the pattern shapes in step S310.

In step S320, a travel distance between a first center point of a first object in a previous frame and a second center point of a second object in the current frame among the consecutive frames is calculated.

In step S330, the travel distance is compared to a predetermined travel distance threshold value and the first object and the second object are determined to same if the travel distance is less than the predetermined travel distance threshold value in step S340.

Here, the predetermined travel distance threshold value may be a value set using a plurality of pieces of survey data with respect to distances in which objects in consecutive frames can be perceived to be the same object.

Figure 14:
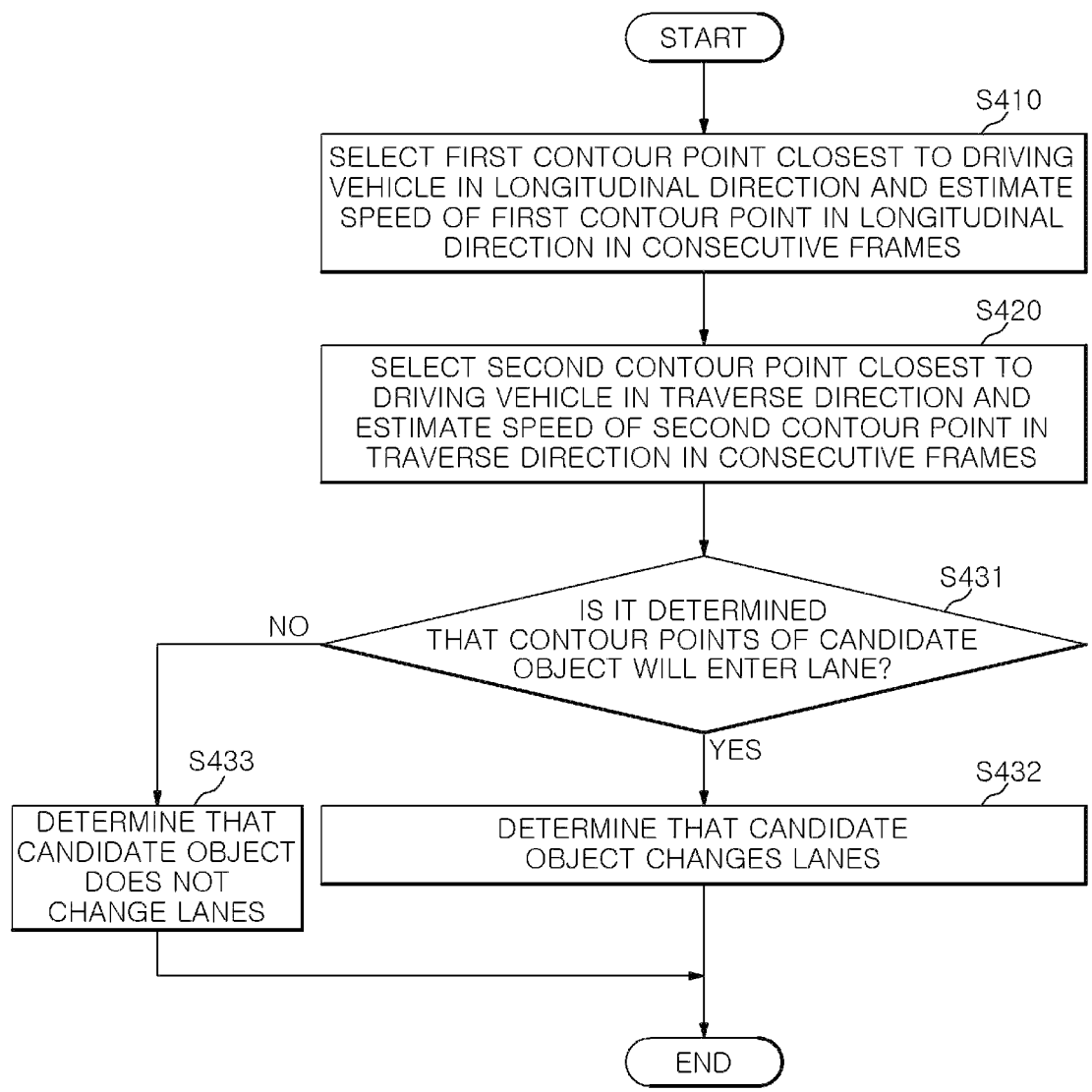
FIG. 14 is a flowchart showing a step of estimating information on movement of a candidate object and determining whether the candidate object changes lanes according to an embodiment of the present invention.

FIG. 14 is a flowchart showing the step of estimating information on movement of a candidate object and determining whether the candidate object changes lanes according to an embodiment of the present invention.

Referring to FIG. 14, in the step S400 of determining whether the candidate object changes lanes based on the information on movement of a candidate object and determining whether the candidate object changes lanes according to an embodiment of the present invention, a first contour point being closest to the driving vehicle in the longitudinal direction is selected from contour points positioned within the pattern shape of the candidate object and corresponding to the contour of the candidate object, and a speed in the longitudinal direction according to a change in the position of the first contour point in the longitudinal direction is estimated in the consecutive frames through a filter algorithm in step S410.

In step S420, a second contour point closest to the driving vehicle in the lateral direction is selected from the contour points positioned inside the pattern shape of the candidate object and corresponding to the contour of the candidate object, and a speed in the lateral direction according to a change in the position of the second contour point in the lateral direction is estimated in the consecutive frames through a filter algorithm.

It is determined whether contour points corresponding to the contour of the candidate object will enter the lane in which the driving vehicle is traveling after a predetermined time using the speed of the candidate object in the longitudinal direction or the speed in the lateral direction in step S431 and it is determined that the candidate object changes lanes if it is determined that contour points corresponding to the contour of the candidate object will enter the lane in which the driving vehicle is traveling after the predetermined time in step S432.

If it is not determined that contour points corresponding to the contour of the candidate object will enter the lane in which the driving vehicle is traveling after the predetermined time, it is determined that the candidate object does not change lanes in step S433.

Here, the lane in which the driving vehicle is traveling includes lane edges positioned on both sides of the lane, and it is determined whether the candidate object enters the lane at least one of detected lane edges.

Figure 15:
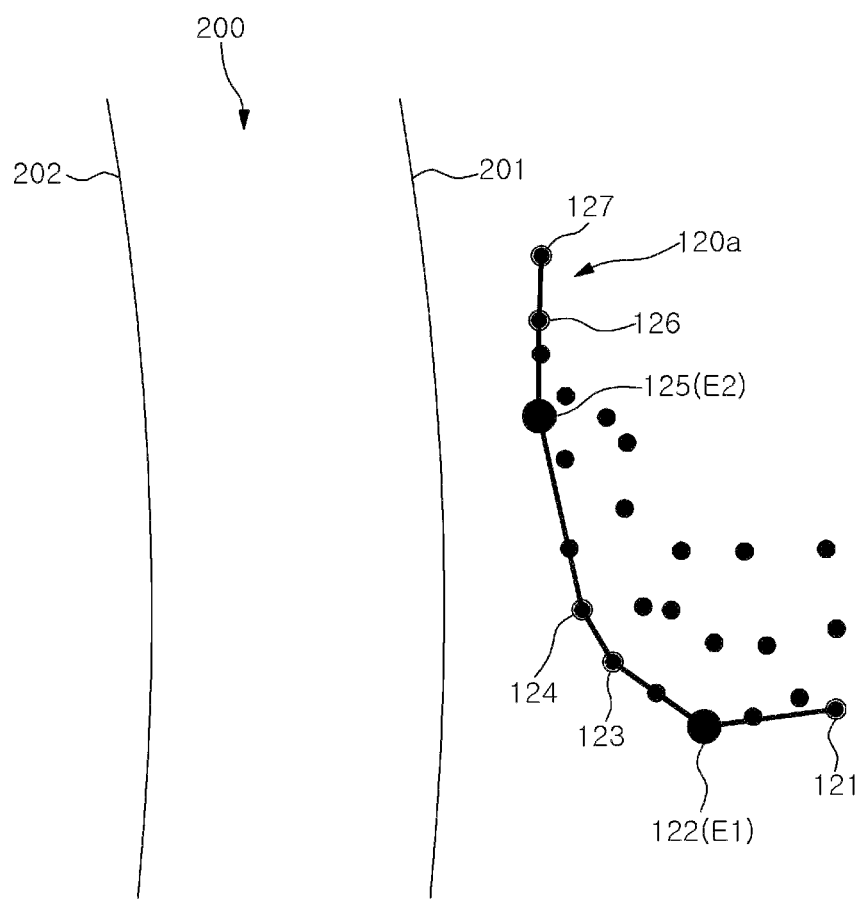
FIG. 15 is a diagram for describing a step of estimating a speed of a candidate object in a longitudinal direction or a speed in a lateral direction according to an embodiment of the present invention.

FIG. 15 is a diagram for describing the step of estimating the speed of the candidate object in the longitudinal direction or the speed thereof in the lateral direction according to an embodiment of the present invention.

To estimate at least one of speeds in the longitudinal direction and the lateral direction, a contour point 122(E1) adjacent to the driving vehicle in the longitudinal direction and a contour point 125(E2) closest to the lane edge 201 in the lateral direction among contour points 120a of an object are used, as shown in FIG. 15. The speed in the longitudinal direction is estimated using the position of the contour point 122(E1) in the longitudinal direction which is closest to the driving vehicle among the contour points through Kalman filtering. In addition, the speed in the lateral direction is estimated using the position of the contour point 125(E2) in the lateral direction which is closest to the lane edge through Kalman filtering.

Here, the Kalman filter is a recursive filter that estimates a state of a linear dynamical system based on measurement values including noise, and the algorithm thereof may be composed of two stages of an estimation and an update. In the estimation stage, values and accuracy of current state variables are estimated. After the values of the current state variables are actually measured, the current state variables are updated by reflecting differences between estimated measurement values and actual measurement values therein based on previously estimated state variables in the update stage.

Figure 16:
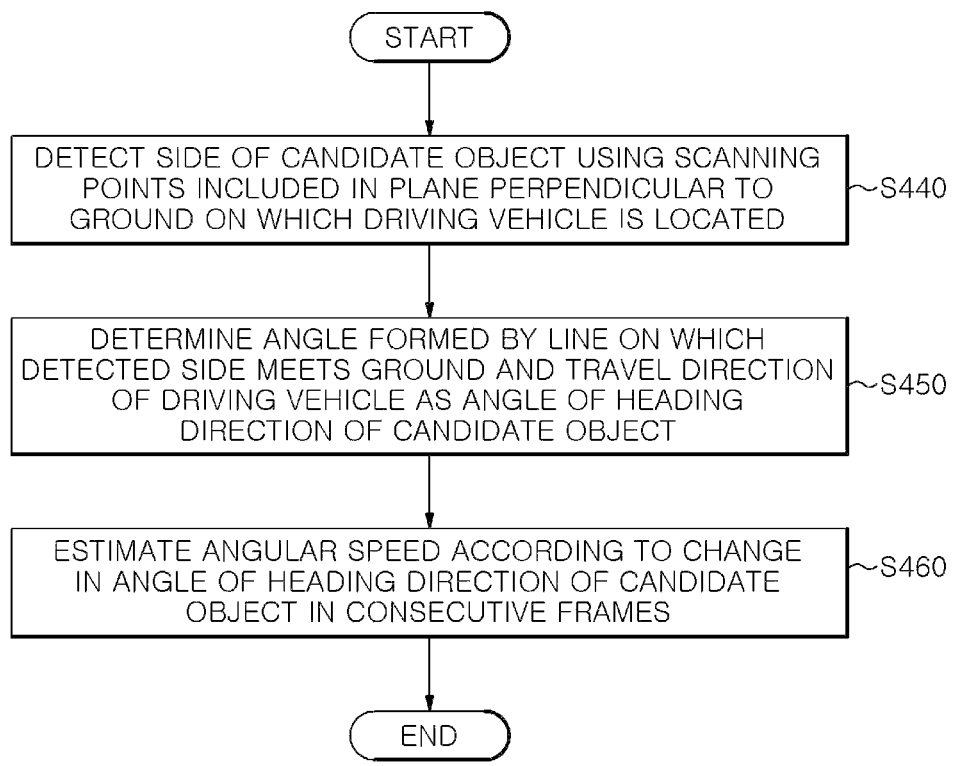
FIG. 16 is a flowchart showing a step of estimating information on a change in a direction of a candidate object and determining whether the candidate object changes lanes according to an embodiment of the present invention.

FIG. 16 is a flowchart showing the step of estimating information on movement of a candidate object and determining whether the candidate object changes lanes according to an embodiment of the present invention.

Referring to FIG. 16, in the step S400 of estimating information on movement of a candidate object and determining whether the candidate object changes lanes according to an embodiment of the present invention, a speed of the candidate object in the longitudinal direction or lateral direction may be estimated to determine whether the candidate object changes lanes or an angular speed of the candidate object according to a change in an angle of a heading direction of the candidate object may be estimated to determine whether the candidate object changes lanes, as described above.

In step S440, a side surface of the candidate object is detected using scanning points corresponding to a plane perpendicular to a ground surface on which the driving vehicle is located among the plurality of scanning points.

In step S450, an angle between a line at which the detected side surface intersects with the ground surface and the travel direction of the driving vehicle is determined as an angle of the heading direction of the candidate object.

In step S460, an angular speed of the candidate object according to a change in the angle of the heading direction of the candidate object in the consecutive frames is estimated through a filter algorithm.

Figure 17:
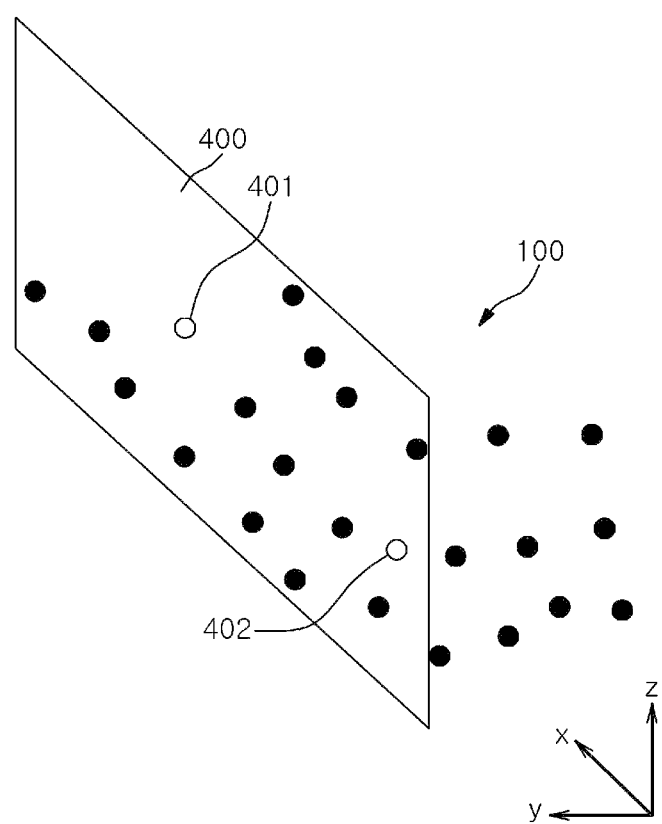
FIG. 17 is a diagram for describing a step of detecting a side of a candidate object according to an embodiment of the present invention.

FIG. 17 is a diagram for describing the step of detecting a side surface of a candidate object according to an embodiment of the present invention.

A side surface of the object is detected in order to estimate an angular speed in an object heading direction. Here, the object heading direction means an angle at which the object enters a lane at the time of changing lanes. To detect the side surface of the object, previously detected ground information is used. Arbitrary two points 401 and 402 are selected from points 100 in the object, and a plane 400 that is perpendicular to the plane of the ground and includes the selected points is generated.

Figure 18:
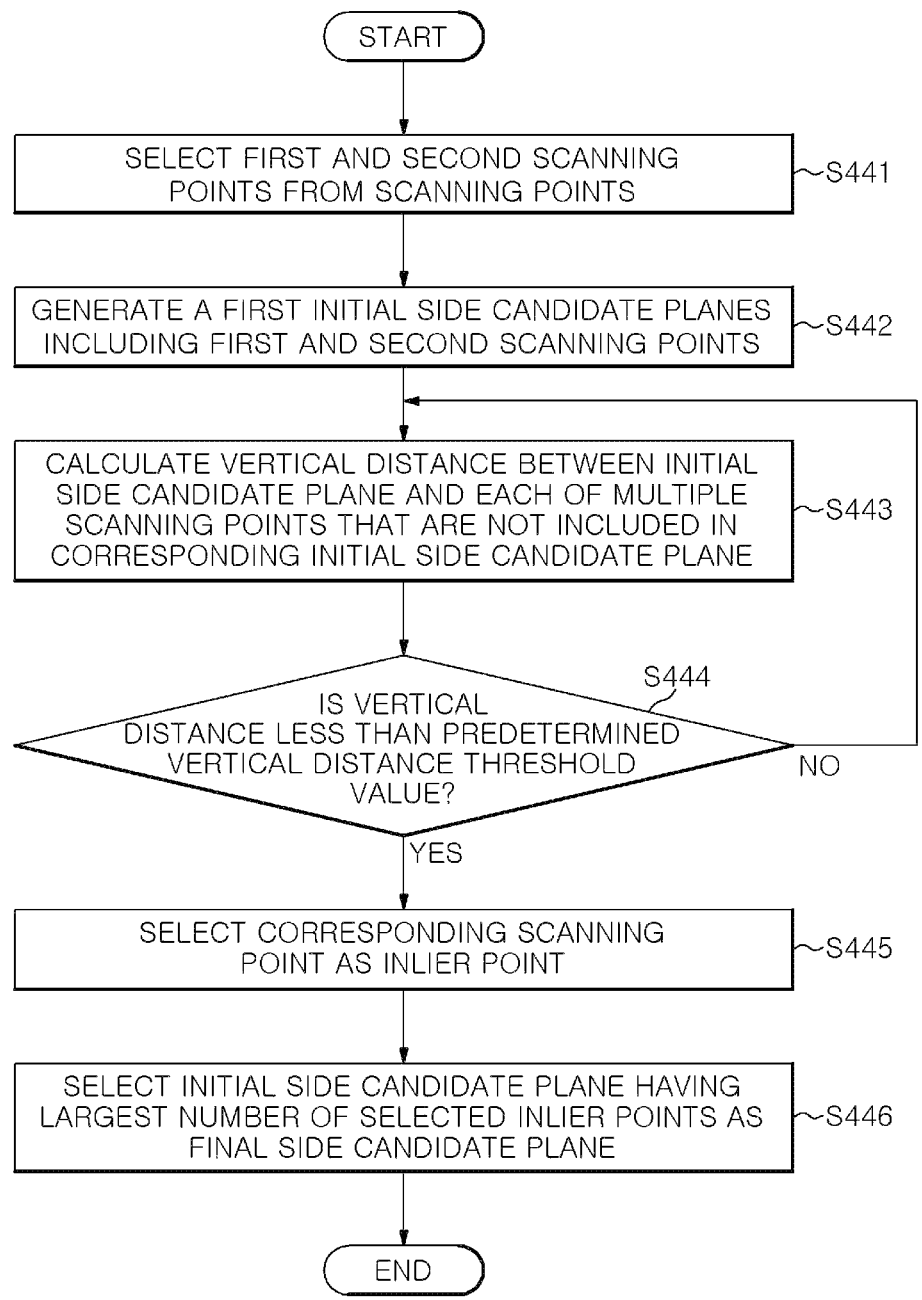
FIG. 18 is a flowchart showing the step of detecting a side of a candidate object according to an embodiment of the present invention.
Figure 19:
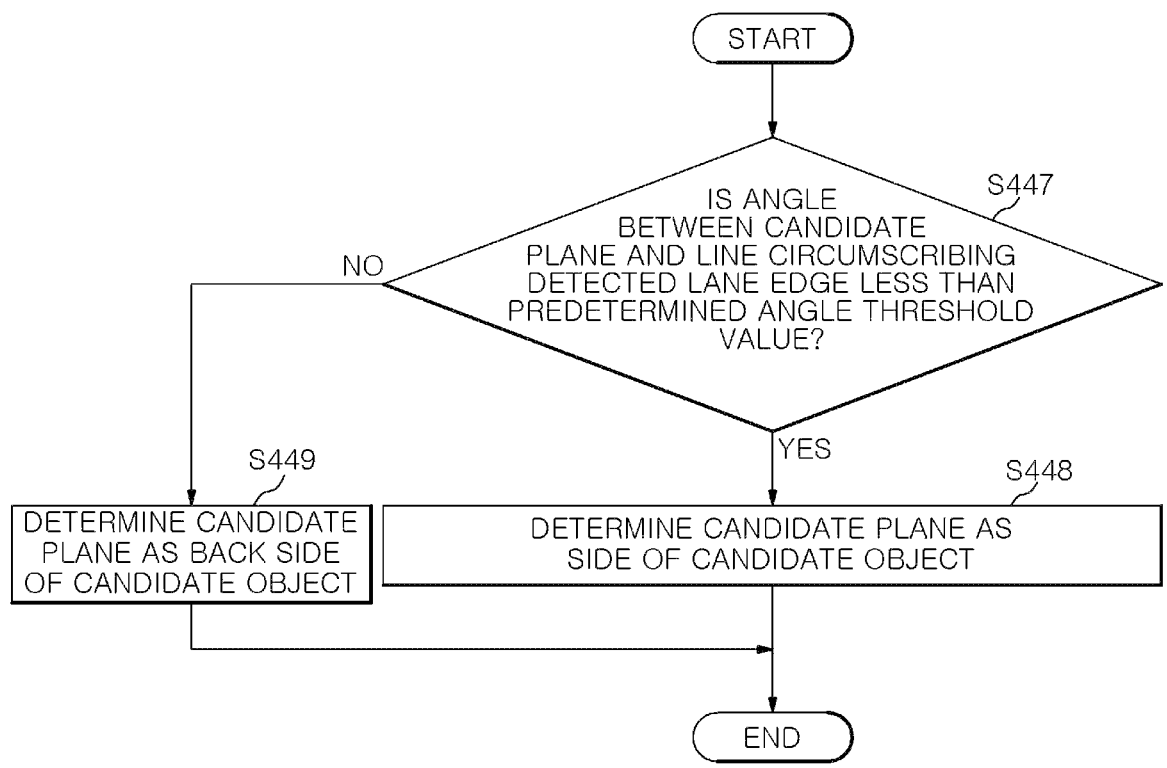
FIG. 19 is a flowchart showing the step of detecting a side of a candidate object according to an embodiment of the present invention.

FIG. 18 and FIG. 19 are flowcharts showing the step of detecting a side surface of a candidate object according to an embodiment of the present invention.

Referring to FIG. 18, in the step S440 of detecting a side surface of a candidate object according to an embodiment of the present invention, a first scanning point and a second scanning points are selected from scanning points included in planes perpendicular to the ground on which the driving vehicle is located in step S441.

In step S442, initial side candidate planes including the first scanning point and the second scanning point are generated.

In step S443, a vertical distance between each initial side candidate plane and each of a plurality of scanning points that are not included in the initial side candidate planes is calculated.

The vertical distance is compared to a predetermined vertical direction threshold value in step S444 and the corresponding scanning point is selected as an inlier point if the vertical direction is less than the predetermined vertical distance threshold value in step S445.

In step S446, an initial side candidate plane including a largest number of inlier points is selected from the generated initial side candidate planes as a final side candidate plane.

Referring to FIG. 19, an angle between the final side candidate plane and a line circumscribing the detected lane edge is compared to a predetermined angle threshold value in step S447, the final side candidate plane is determined to be a side of the candidate object if the angle between the final side candidate plane and the line circumscribing the detected lane edge is equal to or less than the predetermined angle threshold value in step S448, and the final side candidate plane is determined to be the back side of the candidate object if the angle between the final side candidate plane and the line circumscribing the detected lane edge is equal to or greater than the predetermined angle threshold value in step S449.

Then, a plane perpendicular to the back side and closest to a lane edge of the lane in which the driving vehicle is traveling may be determined to be a side of the candidate object.

Figure 21:
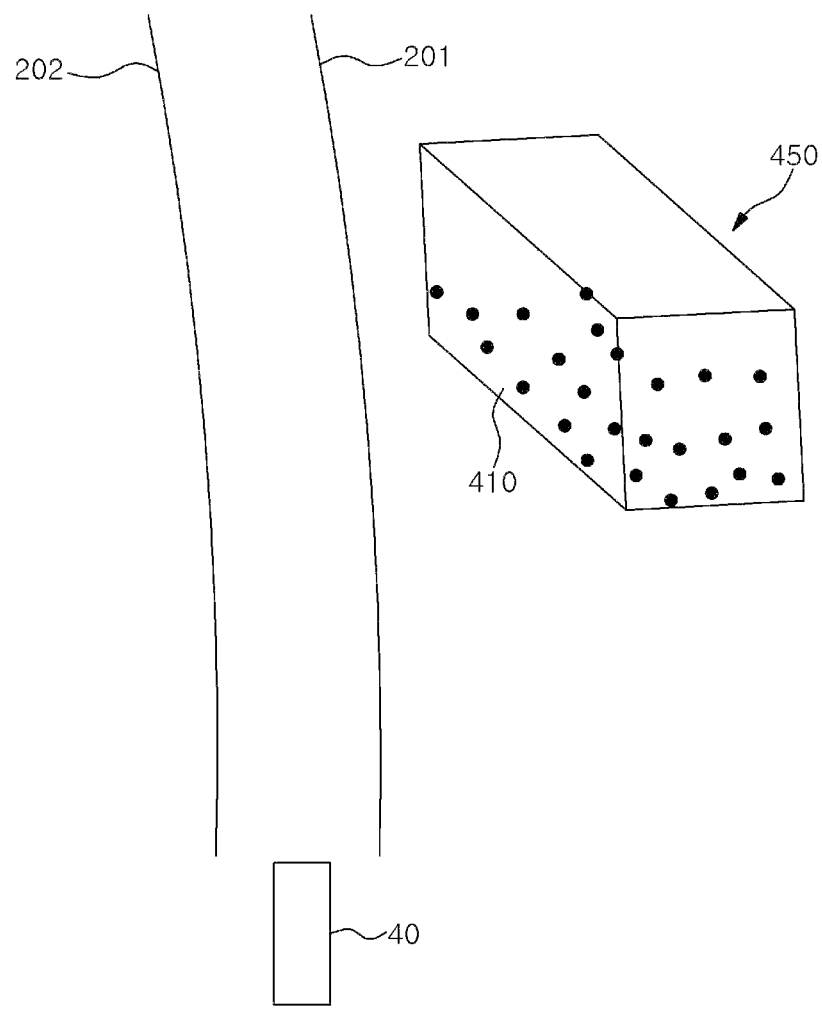
FIG. 21 is a diagram for describing the step of detecting a side of a candidate object according to an embodiment of the present invention.

FIG. 20 and FIG. 21 are diagrams for describing the step of detecting a side of a candidate object according to an embodiment of the present invention.

Vertical distances between generated planes and object points are calculated and inlier points having distances of equal to or less than a specific value are detected. This operation is repeated N times to select a plane having a largest number of inlier points. As shown in FIG. 20, if an angle between a line F1 on which a selected plane 410 of an object meets the ground and a line F2 circumscribing the detected lane edge 201 is less than a predetermined angle, the selected plane 410 is determined to be a side of the object. If the angle is greater than the predetermined angle, the selected plane is determined to be the back side of the object, and a side of the object which is a plane perpendicular to the detected plane and closest to the lane edge is detected.

Here, the predetermined angle threshold value may be a value set using a plurality of pieces of survey data with respect to points at which a lane change is estimated.

Then, as shown in FIG. 21, a three-dimensional box 450 including all points of the object is generated using the detected side plane 410 and an angle of the side is determined as an angle of the heading direction of the object.

Here, the three-dimensional box 450 means a three-dimensional layout having a surface including the detected side.

Figure 22:
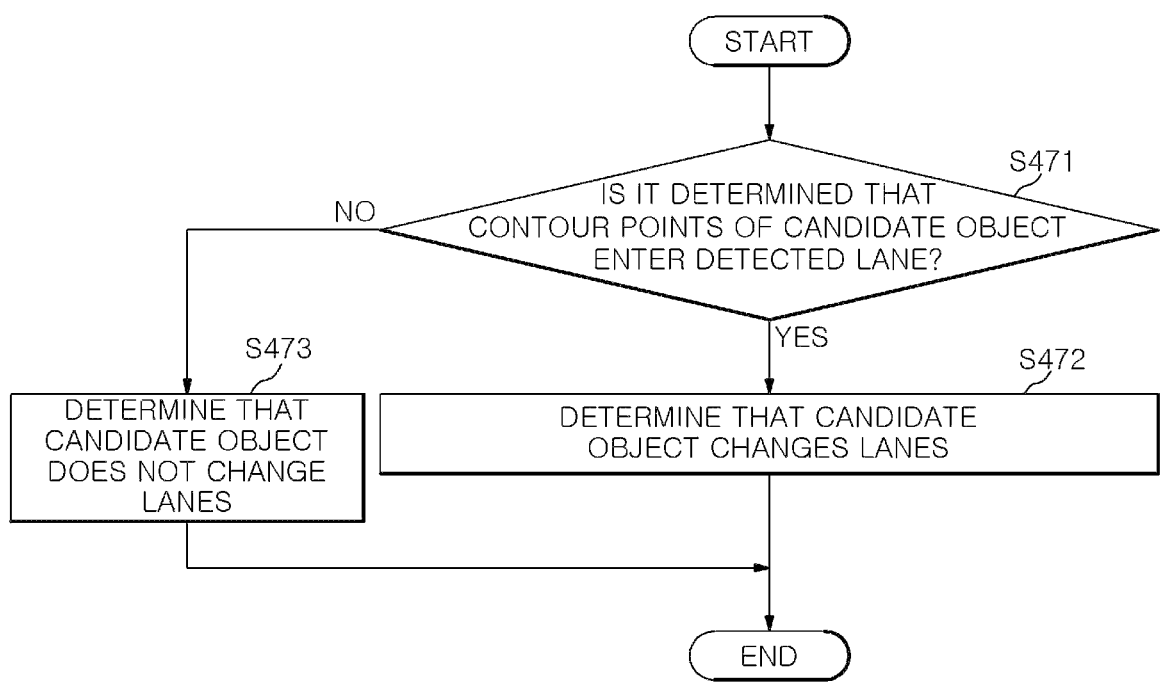
FIG. 22 is a flowchart showing the step of estimating information on movement of a candidate object and determining whether the candidate object changes lanes according to an embodiment of the present invention.

FIG. 22 is a flowchart showing the step of estimating information on movement of a candidate object and determining whether the candidate object changes lanes according to an embodiment of the present invention.

A process of determining and determining whether objects selected through the above-described candidate group search process are driving vehicles that actually cut in the lane in which the driving vehicle is traveling is performed. For the determination, the aforementioned estimated speeds of the objects in the longitudinal/lateral directions and angular speeds of the objects in heading directions are used.

Positions of contour points of the objects after a predetermined time are moved using the speeds in the longitudinal/lateral directions. Objects having contour points moved to the inside of lane edges of the lane in which the driving vehicle is traveling are determined to be lane-changing objects. The method of determining a lane-changing object using speeds in the longitudinal/lateral directions has difficulty determining a lane-changing object in a short distance in a congested state. Accordingly, the present invention uses angular speed information with respect to heading directions of objects. It is determined whether three-dimensional boxes of objects enter the lane in which the corresponding driving vehicle is traveling after a predetermined time using estimated angular speeds in heading directions of the objects to determine a lane-changing object in a short distance.

Referring to FIG. 22, in the step S400 of estimating information on movement of a candidate object and determining whether the candidate object changes lanes according to an embodiment of the present invention, after the angular speed of the candidate object according to a change in the angle of the heading direction of the candidate object in the consecutive frames is estimated through the filter algorithm in step S460, it is determined whether the candidate object enters the lane in which the driving vehicle is traveling after a predetermined time using the angular speed of the candidate object in the heading direction in step S471, and the candidate object is determined to change lanes in step S472 upon whether determining that contour points corresponding to the contour of the candidate object are estimated to cross over a lane change of the lane in which the driving vehicle is traveling after the predetermined time. It is determined that the candidate object does not change lanes in step S473 if it is not determined that contour points corresponding to the contour of the candidate object are estimated to cross over a lane change of the lane in which the driving vehicle is traveling after the predetermined time.

According to an embodiment of the present invention, it is possible to solve problems of conventional systems through robust logic using accurate shape information and three-dimensional information even in a state in which it is difficult to determine a cut-in situation that may occur in operation of an autonomous driving system using a camera or a radar sensor used in conventional ADAS systems. In addition, since it is possible to determine a lane-changing object not only in a normal driving situation but also in a cut-in situation in a short range in a congested state, the present invention can be used as a core function for improving the performance of functions such as determination of an object dangerous to a driving vehicle that is traveling and generation of a travel route.

Furthermore, the present invention can provide a recording medium storing a computer program including instructions for executing a method for determining a lane change, which includes a step of detecting a plurality of objects located around a driving vehicle using scanning information obtained repeatedly at every predetermined period of time by the sensor scanning surroundings of the driving vehicle, a step of selecting at least one candidate object estimated to change lanes among the plurality of objects based on previously detected lane edge information, and a step of determining whether the candidate object changes lanes based on information on movement of the candidate object.

In addition, the present invention can provide a computer program stored in a computer-readable storage medium, which includes instructions for executing a method for determining a lane change, which includes a step of detecting a plurality of objects located around a driving vehicle using scanning information obtained repeatedly at every predetermined period of time by the sensor scanning surroundings of the driving vehicle, a step of selecting at least one candidate object estimated to change lanes among the plurality of objects based on previously detected lane edge information, and a step of determining whether the candidate object changes lanes based on information on movement of the candidate object.

Such a computer-readable medium may include program commands, data files, data structures, or combinations thereof. Program commands recorded in the recording medium may be specially designed and configured for the present invention or known to and available for those skilled in the computer software field. Examples of computer-readable recording media may include magnetic media such as a hard disk, a floppy disk, and a magnetic tape, optical media such as a CD-ROM and a DVD, magneto-optical media such as a floptical disk, and hardware devices specially configured to store and execute program commands, such as a ROM, a RAM, and a flash memory. Examples of program commands include high-level language code executable by a computer using an interpreter as well as machine language code generated by a complier. The aforementioned hardware devices may be configured to operate as one or more software modules to perform operation of the present invention, and vice versa.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method for determining a lane change and for collision avoidance, performed by an apparatus for determining a lane change of an object located around a driving vehicle with which is equipped a sensor, wherein the lane change of the object intrudes the driving path of the driving vehicle, the method comprising:

detecting a plurality of objects located around the driving vehicle using scanning information obtained repeatedly at every predetermined period of time by the sensor scanning surroundings of the driving vehicle;

selecting at least one candidate object estimated to change lanes among the plurality of objects based on previously detected lane edge information;

determining whether the at least one candidate object changes lanes based on information including an angle of a heading direction of the candidate object on movement of the at least one candidate object; and prompting the driving vehicle, upon determination of the lane change of the at least one candidate object, to avoid collision with the at least one candidate object by accelerating, decelerating, or changing its driving direction, wherein the sensor includes a LIDAR sensor and the scanning information includes a plurality of scanning points obtained through the LIDAR sensor, and the sensor further includes an imaging device and the previously detected lane edge information includes coordinate information of lane edges detected from images obtained through the imaging device, wherein the determining of whether the at least one candidate object changes lanes based on information including an angle of a heading direction of the candidate object on movement of the at least one candidate object comprises:

detecting a side surface of the at least one candidate object using scanning points corresponding to a plane perpendicular to a ground surface on which the driving vehicle is located from the plurality of scanning points; and determining an angle between a line at which the detected side surface intersects with the ground surface and a line circumscribing a lane edge of a lane within which the driving vehicle travels.

2. The method of claim 1, wherein the lane change includes change from a second lane closest to a first lane within which the driving vehicle is traveling to the first lane.

3. The method of claim 1, wherein the detecting of the plurality of objects located around the driving vehicle comprises:

excluding ground surface scanning points corresponding to a ground surface on which the driving vehicle is located from the plurality of scanning points; and selecting a pattern shape including and corresponding to a contour of each object using remaining scanning points other than the ground surface scanning points.

4. The method of claim 3, wherein the selecting of at least one candidate object estimated to change lanes among the plurality of objects comprises:

calculating a first distance from a pattern point positioned on each side constituting the pattern shape corresponding to a shape of each object to a detected lane edge of a lane within which the driving vehicle travels; and classifying an object the first distance of which is less than a first predetermined threshold value as a first candidate object.

5. The method of claim 4, wherein the selecting of at least one candidate object estimated to change lanes among the plurality of objects comprises:

calculating a second distance from a contour point positioned within a pattern shape of each first candidate object and corresponding to a contour of the first candidate object to the detected lane edge; and selecting a first candidate object the second distance of which is less than a predetermined second threshold value as the at least one candidate object.

6. The method of claim 3, further comprising perceiving a same object in among consecutive frames, each frame including scanning information obtained at a time, and associating the scanning information of the same object with one another after the selecting at least one candidate object estimated to change lanes among the plurality of objects.

7. The method of claim 6, wherein the perceiving of the same object in the consecutive frames and associating the scanning information of the same object with one another comprises:

selecting center points positioned at centers of the pattern shapes of the objects of the respective consecutive frames;

calculating a travel distance between a first center point of a first object in a previous frame and a second center point of a second object in a current frame among the consecutive frames; and determining the first object and the second object to be same if the travel distance is less than a predetermined travel distance threshold value.

8. The method of claim 1, wherein the information on movement of the candidate object includes at least one of a speed in a longitudinal direction, a speed in a lateral direction, and an angular speed in a heading direction of the candidate object.

9. The method of claim 8, wherein the determining of whether the at least one candidate object changes lanes based on the information including an angle of a heading direction of the candidate object on movement of the at least one candidate object comprises selecting a specific contour point being closest to the driving vehicle in the longitudinal direction from contour points positioned within a pattern shape of the candidate object and corresponding to a contour of the candidate object, and estimating a speed in the longitudinal direction according to a change in a position of the specific contour point in the longitudinal direction in consecutive frames through a filter algorithm.

10. The method of claim 8, wherein the determining of whether the at least one candidate object changes lanes based on the information including an angle of a heading direction of the candidate object on movement of the at least one candidate object comprises selecting a specific contour point closest to the driving vehicle in the lateral direction from contour points positioned within the pattern shape of the candidate object and corresponding to a contour of the candidate object, and estimating a speed in the lateral direction according to a change in a position of the specific contour point in the lateral direction in consecutive frames through a filter algorithm.

11. The method of claim 8, wherein the determining of whether the at least one candidate object changes lanes based on the information including an angle of a heading direction of the candidate object on movement of the at least one candidate object comprises:

determining an angle between a line at which the detected side surface intersects with the ground surface and a travel direction of the driving vehicle as an angle of a heading direction of the candidate object.

12. The method of claim 11, wherein the detecting of the side surface of the candidate object comprises:

a first step of selecting a first and a second scanning point from the scanning points;

a second step of generating a first initial side candidate plane including the first and second scanning points;

a third step of selecting a third and a fourth scanning point from the scanning points, the third and the fourth scanning point being respectively different from the first and the second scanning point;

a fourth step of generating another initial side candidate plane, the initial side candidate plane including the third and the fourth scanning point; and repeating the first step to the fourth step to generate a plurality of initial side candidate planes, the plurality of initial side candidate planes being different from one another and perpendicular to the ground surface.

13. The method of claim 12, wherein the detecting of the side of the candidate object comprises:

calculating a perpendicular distance between each of the initial side candidate planes and each of a plurality of scanning points that are not included in the corresponding initial side candidate plane;

selecting the corresponding scanning point as an inlier point if the perpendicular distance is less than a predetermined perpendicular distance threshold value;

selecting an initial side candidate plane having a largest number of selected inlier points among the plurality of generated initial side candidate planes as a final side candidate plane; and determining the final side candidate plane as the side surface of the candidate object if an angle between the final side candidate plane and a line circumscribing the detected lane edge is less than a predetermined angle threshold value.

14. The method of claim 11, wherein the determining of whether the at least one candidate object changes lanes based on the information including an angle of a heading direction of the candidate object on movement of the at least one candidate object comprises:

estimating the angular speed of the candidate object according to a change in the angle of the heading direction of the candidate object in consecutive frames through a filter algorithm;

determining the candidate object to change lanes upon whether determining that contour points corresponding to a contour of the candidate object are estimated to cross over a lane change of the lane in which the driving vehicle is traveling after a predetermined time using the angular speed of the candidate object in the heading direction.

15. The method of claim 8, wherein the determining of whether the at least one candidate object changes lanes based on the information including an angle of a heading direction of the candidate object on movement of the at least one candidate object comprises determining the candidate object to change lanes upon whether determining that contour points corresponding to a contour of the candidate object are estimated to cross over a lane change of the lane in which the driving vehicle is traveling after a predetermined time based on the speed of the candidate object in the longitudinal direction or the speed in the lateral direction.

16. An apparatus for determining a lane change of an object located around a driving vehicle with which is equipped a sensor for the purpose of prompting the driving vehicle to avoid collision, wherein the lane change of the object intrudes the driving path of the driving vehicle, the apparatus comprising:

a memory configured to store scanning information obtained by scanning surroundings of the driving vehicle; and a processor configured to determine a lane change of the object from the scanning information, wherein the processor is configured to detect a plurality of objects located around the driving vehicle using scanning information obtained repeatedly at every predetermined period of time by the sensor scanning surroundings of the driving vehicle, to select at least one candidate object estimated to change lanes among the plurality of objects based on previously detected lane edge information, to determine whether the at least one candidate object changes lanes based on information including an angle of a heading direction of the candidate object on movement of the at least one candidate object, and, when the at least one candidate object is determined to have changed lane, to prompt the driving vehicle to accelerate, decelerate, or change its driving direction, wherein the sensor includes a LIDAR sensor and the scanning information includes a plurality of scanning points obtained through the LIDAR sensor, and the sensor further includes an imaging device and the previously detected lane edge information includes coordinate information of lane edges detected from images obtained through the imaging device, wherein the processor is further configured to detect a side surface of the at least one candidate object using scanning points corresponding to a plane perpendicular to a ground surface on which the driving vehicle is located from the plurality of scanning points; and determine an angle between a line at which the detected side surface intersects with the ground surface and a line circumscribing a lane edge of a lane within which the driving vehicle travels.

17. A non-transitory computer-readable recording medium storing a computer program including instructions for executing a method for determining a lane change of an object located around a driving vehicle with which is equipped a sensor for the purpose of prompting the driving vehicle to avoid collision, wherein the lane change of the object intrudes the driving path of the driving vehicle, the method comprising:

detecting a plurality of objects located around a driving vehicle with which is equipped a sensor using scanning information obtained repeatedly at every predetermined period of time by the sensor scanning surroundings of the driving vehicle;

selecting at least one candidate object estimated to change lanes among the plurality of objects based on previously detected lane edge information;

determining whether the at least one candidate object changes lanes based on information including an angle of a heading direction of the candidate object on movement of the at least one candidate object; and prompting the driving vehicle, upon determination of the lane change of the at least one candidate object, to avoid collision with the at least one candidate object by accelerating, decelerating, or changing its driving direction, wherein the sensor includes a LIDAR sensor and the scanning information includes a plurality of scanning points obtained through the LIDAR sensor, and the sensor further includes an imaging device and the previously detected lane edge information includes coordinate information of lane edges detected from images obtained through the imaging device, wherein the determining of whether the at least one candidate object changes lanes based on information including an angle of a heading direction of the candidate object on movement of the at least one candidate object comprises:

detecting a side surface of the at least one candidate object using scanning points corresponding to a plane perpendicular to a ground surface on which the driving vehicle is located from the plurality of scanning points; and determining an angle between a line at which the detected side surface intersects with the ground surface and a line circumscribing a lane edge of a lane within which the driving vehicle travels.

* * * * *